US012783709B2

(12) United States Patent
Wu et al.

(10) Patent No.: US 12,783,709 B2
(45) Date of Patent: Nov. 3, 2026

(54) METHOD AND SYSTEM FOR KERNEL DATA ISOLATION BASED ON MULTIPLE KERNEL PAGE TABLES

(71) Applicant: Huazhong University of Science and Technology, Wuhan City (CN)

(72) Inventors: Song Wu, Wuhan City (CN); Zixuan Wang, Wuhan City (CN); Hao Fan, Wuhan City (CN); Zhuo Huang, Wuhan City (CN); Dezhong Yao, Wuhan City (CN); Hai Jin, Wuhan City (CN)

(73) Assignee: Huazhong University of Science and Technology, Wuhan City (CN)

( * ) Notice: Subject to any disclaimer, the term of this patent is extended or adjusted under 35 U.S.C. 154(b) by 137 days.

(21) Appl. No.: 19/039,744

(22) Filed: Jan. 28, 2025

(65) Prior Publication Data

US 2025/0284833 A1 Sep. 11, 2025

(30) Foreign Application Priority Data

Mar. 6, 2024 (CN) ........................ 202410256023.2

(51) Int. Cl.

*G06F 21/62* (2013.01)
*G06F 12/1009* (2016.01)
*G06F 21/56* (2013.01)

(52) U.S. Cl.

CPC ...... *G06F 21/6218* (2013.01); *G06F 12/1009* (2013.01); *G06F 21/566* (2013.01); *G06F 2221/034* (2013.01)

(58) Field of Classification Search

CPC ............. G06F 21/6218; G06F 12/1009; G06F 21/566; G06F 2221/034; G06F 12/1441;

(Continued)

(56) References Cited

U.S. PATENT DOCUMENTS 8,489,800 B2 * 7/2013 Tuch ................... G06F 12/1036 711/6
2018/0024938 A1 * 1/2018 Paltashev ............. G06F 12/128 711/133

(Continued)

FOREIGN PATENT DOCUMENTS

CN 101477477 7/2009
CN 101477477 A * 7/2009

(Continued)

OTHER PUBLICATIONS

Kele Huang et al. 2021. BTMMU: an efficient and versatile cross-ISA memory virtualization. In Proceedings of the 17th ACM SIGPLAN/SIGOPS International Conference on Virtual Execution Environments (VEE 2021). Association for Computing Machinery, New York, NY, USA, 71-83. (Year: 2021).*

(Continued)

*Primary Examiner* — Zhimei Zhu
(74) *Attorney, Agent, or Firm* — Michael Ye; Kalos Athena Wang PLLC

(57) ABSTRACT

A method and system for kernel data isolation based on multiple kernel page tables is provided. Through creating multiple kernel page tables in a kernel system and binding specific applications to a corresponding page table for operation, each internal process of the application remains consistent with the corresponding page table in terms of kernel address space, and the kernel address spaces of different applications are isolated from each other due to existence of the different page tables. The system includes a page table management module and a private memory management module. The present disclosure protects private application data at the granularity of applications in the same kernel at very low costs to prevent data breach caused by read attacks on kernel address space or privilege escalation attacks, maintains privilege level division of kernel address (Continued)

spaces, and ensures transparency of private memories among applications and general IO capability of private memories.

16 Claims, 4 Drawing Sheets

(58) Field of Classification Search
CPC ............... G06F 12/1491; G06F 12/145; G06F 2212/1052; G06F 21/52; G06F 12/0811; G06F 21/6281; G06F 9/5016
See application file for complete search history.

(56) References Cited

U.S. PATENT DOCUMENTS

| | | | | |
|---|---|---|---|---|
| 2020/0364150 | A1 * | 11/2020 | Breslow | G06F 12/1036 |
| 2025/0231888 | A1 * | 7/2025 | Peng | G06F 12/1483 |

FOREIGN PATENT DOCUMENTS

| | | | | |
|---|---|---|---|---|
| CN | 107168801 | | 9/2017 | |
| CN | 107168801 A | * | 9/2017 | G06F 9/5016 |
| CN | 107194245 | | 9/2017 | |
| CN | 117077132 A | * | 11/2023 | G06F 21/566 |
| CN | 117251843 A | * | 12/2023 | G06F 21/52 |

OTHER PUBLICATIONS

Jonathan Corbet, “The current state of kernel page-table isolation”, Dec. 20, 2017, obtained online from <https://lwn.net/Articles/741878/>, retrieved on Aug. 30, 2026 (Year: 2017).*

Yinggang Guo, Zicheng Wang, Bingnan Zhong, and Qingkai Zeng. 2022. Formal Modeling and Security Analysis for Intra-level Privilege Separation. In Proceedings of the 38th Annual Computer Security Applications Conference (ACSAC ’22). Association for Computing Machinery, New York, NY, USA, 88-101 (Year: 2022).*

* cited by examiner

METHOD AND SYSTEM FOR KERNEL DATA ISOLATION BASED ON MULTIPLE KERNEL PAGE TABLES

This application claims the benefit of China Patent Application No. 202410256023.2 filed on Mar. 6, 2024, which is incorporated by reference herein in its entirety.

BACKGROUND OF THE APPLICATION

1. Technical Field

The present disclosure generally relates to security of operating systems, and more particularly to a method and a system for kernel data isolation based on multiple kernel page tables.

2. Description of Related Art

Currently, kernels in operating systems operating on memory management units (MMU) as a hardware basis are designed according to the principle of a unified kernel address space. In such a system, the kernel address spaces of all processes are totally consistent and in reading-and-writing synchronization. However, in kernel address spaces, all physical memories are linearly and completely mapped, and this cause hidden danger to data in the kernels.

With the continuous development of cloud computing, the number of application instances running in a common kernel has been increased. They can illegally read data in the kernel address space by taking advantage of kernel code vulnerability (e.g., privilege escalation attacks) or hardware vulnerability (e.g., Spectre-V2, Retbleed attacks), and thereby acquire private data of other applications. The hitherto commonly used design based on a unified kernel address space however cannot provide isolation among application instances and is thus unable to protect the system from such attacks.

Existing approaches to kernel data isolation can be generally classified into two types. The first type is based on properties of emerging hardware. They are mainly supported by memory virtualization hardware (e.g., EPT from Intel) to run application instances in virtual machines, or are supported by trusted computing hardware (e.g., TEE from Intel) to place private data memories of applications into hardware-encrypted sandboxes. The second type is based on software. They provide access control for particular data using access restriction to virtual address spaces, or limit memory usage or file system views using CGroup or Name Space in existing Linux kernels.

For example, CN107194245A discloses a method for remolding function calling specific to Linux kernel page-table isolation. Kernel page-table isolation isolates modules from each other by separately mapping the code and data of the isolated module to a physical address space controlled by a specific page table and controlling the access interval for the page table. The known scheme is designed to remold function calling among modules in a Linux system, so as to ensure the isolated module can normally access codes and data of other modules in the kernel. It primarily comprises the following steps: (1) compiling a Clang compiler plugin to obtain the function calling relationship chart of the isolated modules; (2) compiling a search algorithm for searching for call sites of interface functions; (3) implementing a stub sub-module and a callback sub-module in the isolated modules and the kernel, respectively; (4) at every call site, replacing the original interface function with a stub function; and (5) redirecting process control blocks so as to ensure data consistency.

However, according to the art known by the inventor(s), isolation based on emerging hardware requires relatively high performance costs and needs support from particular hardware. It may even need modification and adaption of applications. On the other hand, software-based isolation affects data globally, and cannot function at the granularity of applications. Importantly, the scheme native to a Linux kernel limits merely memory usage and provides no mechanisms and solutions for data isolation. Hence, there is a pressing need for an efficient, application-grained solution of kernel data isolation that does not need modification of applications and does not need specific hardware as an auxiliary.

Since there is certainly discrepancy between the existing art comprehended by the applicant of this patent application and that known by the patent examiners and since there are many details and disclosures disclosed in literatures and patent documents that have been referred by the applicant during creation of the present disclosure not exhaustively recited here, it is to be noted that the present disclosure shall actually include technical features of all of these existing works, and the applicant reserves the right to supplement the application with the related art more existing technical features as support according to relevant regulations.

SUMMARY OF THE APPLICATION

To solve the problem of kernel-related untrustedness, there have been technical schemes for kernel isolation based on independent execution spaces using page tables. For example, a patent document published as CN107168801A discloses an approach to isolation and protection of kernel dynamic data based on multiple page tables. This existing approach mainly involves page-table management, memory allocation, and page-fault handling in Linux systems. It is achieved by: creating plural kernel-mode page tables during kernel initialization, so as to construct plural independent memory views in the Linux kernel, wherein in normal situations, the kernel ensures its correct operation by switching among these kernel-mode page tables; then modifying a memory allocator in the Linux system, using an allocation mark to tell to which of the memory views the currently allocated memory shall correspond, and modifying the kernel-mode page table corresponding to the memory view, so that the allocated memory is visible in the memory view and invisible in the other memory views; at last, modifying the page fault program by adding a new kernel-mode page fault processing logic for processing kernel-mode page fault abnormality that happens when the kernel accesses the memory zone invisible in the current page table. However, the known technical scheme achieves isolation of the kernel by nothing more than limiting memory usage in the Linux kernel, and thus is also uncapable of accomplishing kernel isolation based on data isolation. Particularly, to construct plural independent memory views in the Linux kernel needs to use different memory allocation marks for identification and needs to modify the corresponding kernel-mode page table to make the allocated memory available in the memory view. This configuration is actually about isolating dynamic data of different kernel components to different kernel page tables by specifying memory space addresses accessible to the kernel when operating under a given component, and is obviously different from the present disclosure that enables kernel data isolation at the granularity of applications.

In view of the shortcomings of the existing art, the inventor of the present disclosure uses a kernel virtual address space as a basis, and breaks the principle of the existing unified address space design, so as to propose a method and a system for kernel data isolation based on multiple kernel page tables. Starting from this design, the inventor further proposes a private memory allocator for the functional sub-systems in the kernel to use. In the present disclosure, by generating plural kernel page tables during normal operation of the kernel system, the system management process can bind an application to a kernel page table when starting the application, so that kernel synchronization for all processes in the application can only perform through the corresponding kernel page table during operation. On this basis, each said application may hide its private data in a private memory of the corresponding page table indirectly through the private memory allocator, and the private memory in one page table is completely invisible to the other page table. This ensures data consistency throughout an application and data isolation among different applications, thereby ensuring security of application data at the kernel level.

As the first aspect of the present disclosure, a method for kernel data isolation based on multiple kernel page tables is disclosed, wherein multiple kernel page tables are created in a kernel system, and each specific application is bound to a corresponding said page table for operation, so that kernel address space of each internal process of the application remains consistent with the corresponding page table, and the kernel address spaces of different applications are isolated from each other due to existence of the different page tables.

As compared to the existing solutions, the method for kernel data isolation as disclosed herein allows creation of kernel page tables to be bound to specific applications. According to the foregoing distinguishing technical features, issues to be addressed by the present disclosure may include: how to implement kernel data isolation at the granularity of applications. There have been technical schemes for isolation among different kernel spaces in the art. For example, a patent document published as CN101477477A discloses a kernel space isolation method, which comprises: when a kernel mode business running on the CPU core requires a physical space, setting a private virtual space for the CPU core in the non-public system space of the virtual space of the CPU core; and determining the physical space of the CPU core and establishing the mapping relationship between the private virtual space of the CPU core and the physical space of the CPU core, so that the kernel mode business running on the CPU core accesses the physical space according to the private virtual space and the mapping relation. Therein, the virtual space of the CPU core is isolated from the virtual spaces of the other CPU cores. However, the known technical scheme is still about creating private page tables by the CPU core its own through a communication device. The page table entry, corresponding to the private virtual space of the CPU core, in the private page table is pointed to the private physical space of the CPU core, representing fixed correspondence of page tables based on physical storage spaces. Specifically, as compared to the known Linux monolithic kernel operating with globally unified kernel address spaces and a single kernel page-table, the present disclosure allows a multi-page-table kernel to dynamically generate plural kernel page tables during operation by creating plural kernel page tables, so that every untrusted application operates on a respective page table, thereby achieving data isolation at the granularity of applications and at the level of kernel address spaces. With such configuration, applications can hide their private data in the respective page tables so as to isolate their private data from each other, thereby accomplishing kernel data isolation at the granularity of applications, with low costs, and of high compatibility.

According to a preferred mode, when a process in the kernel system needs to copy mapping relationship of the kernel address spaces, the corresponding page table has to be found among the multiple kernel page tables and copied. And when the process in the kernel system needs to modify the mapping relationship of the kernel address spaces, the corresponding page table has to be found among the multiple kernel page tables and modified for its mapping.

According to a preferred mode, a page table management module is configured to classify each said process in the kernel system as either a customizer or a customizee, and classify each said page table as either a privileged page table or a non-privileged page table. The privileged page table is mapped with privileged codes for a said customizer to use to generate, destroy and customize a said page table, and to place the page table into a page table pool. Each said non-privileged page table does not contain any of the privileged codes for page table operations and does not contain any function or interface related to page table customization, so as to prevent escape from the non-privileged page tables caused by a control flow hijacking attack.

As compared to the foregoing known scheme, configuration of the page table management module in the present disclosure may include dividing page tables into a privileged page table and non-privileged page tables according to the types of the system processes. According to the foregoing distinguishing technical features, issues can be addressed by the present disclosure may include: how to achieved access management of kernel page tables according to different types of processes of the system, and in turn improve data security across processes controlled by different applications. Specifically, kernel page-table management is achieved by classifying each process in the kernel system as either a customizer or a customizee, wherein the kernel address space of every customizer is mapped with complete physical memories and privileged codes, and the page table corresponding to this address space is named as a privileged page table. The customizer can use these privileged codes to generate non-privileged page tables and bind the generated page tables to the customizees. As system processes controlled by untrusted third-party applications, the customizees are peremptorily activated by the customizer to operate on non-privileged page tables that are not mapped with the privileged codes and private data of the other applications.

According to a preferred mode, during normal operation of the kernel system, the page table management module is used to generate the multiple kernel page tables, so that a management process of the kernel system when staring each said application binds the application to one said kernel page table, wherein all of the internal processes of the application during operation are only allowed to perform kernel synchronization through the corresponding kernel page table.

Preferably, the page table management module may perform one or more of the following steps:

when the system is booted, constructing a kernel page table for the kernel through regular procedures, and running all initial processes as customizers in the initial kernel page table, wherein the initial kernel page table is the only privileged page table in the system;

wherein the privileged page table contains privileged codes for all the customizers to use to create page tables, thereby enabling isolation among applications, in which the customizer may use the privileged interface function "Page Table Generation" to generate plural page table instances and place them into the page table pool to be used later by activated applications; and wherein the customizer running in the privileged page table activate untrusted applications, and use a system call mfork to bind root processes of the applications to the page tables;

when an arbitrary process of an application use a system call fork to generate a child process, following the principle that "when a process in the kernel system needs to copy the mapping relationship of the kernel address spaces, among the kernel page tables, the corresponding page table has to be found to copy", using the non-privileged interface function to force the child process to inherit the page table from its parent process, and mapping and synchronizing the page table to the kernel page table of the child process, thereby completing generation of the child process;

during operation of the application, when a kernel execution path (e.g., anonymous pipe allocation, anonymous page allocation, or private file system page cache allocation) triggers use of the private memory allocator, making the kernel use the non-privileged interface function in the private memory allocator to allocate a private memory for the corresponding application;

when an arbitrary non-privileged process exits the system, making the process use a page table to exit the interface, thereby reducing the reference count of the page table; and allowing a management process running on the privileged page table to use the privileged interface function named "Page Table Destroying" to release a page table from the page table pool if the reference count of page table instance is zero, and if the reference count is not zero, not to release the page table.

According to a preferred mode, each said application hides private data thereof in a private memory of the corresponding page table indirectly using a private memory allocator, so that the private memory of one said page table is completely invisible to the other page tables, wherein the private memory allocator is configured to be a private memory management module that combines a two-level cache design, a means of stacked management, and an auxiliary page table design.

Preferably, the private memory management module may perform one or more of the following steps:

when the system is booted, creating the initial privileged page table;

when the system creating auxiliary page tables, re-constructing mapping of page tables in the linear memory map;

performing the management process to construct the non-privileged page tables, wherein the linear physical-memory maps of the non-privileged page tables directly copy the corresponding zone mapping relationship of the auxiliary page tables, and the management process is defined with an upper limit for use of the private memory by a page table, thereby the management process enabling isolated operations of the applications;

making a first level cache check whether any of its huge page (2MB) comprises any idle page (4KB), and allocate a 2MB huge page through a kernel buddy system if not; unmapping the allocated 2MB huge page from the auxiliary page table, and marking the page table entry at the corresponding location in the privileged page table as non-global; and after allocation of the 2MB huge page, managing the first level cache and performing allocation using a 512-bit bitmap; and when an application triggers allocation of the private memory through the kernel execution path, and the second level cache owned by the application needs to be expanded due to exhaustion, calling the first level cache process to map the physical page into the private-vmalloc address zone of the page table, and marking the page table entry as non-global, wherein modification to mapping follows the principle that "when the process in the kernel system needs to modify the mapping relationship of the kernel address spaces, the corresponding page table has to be found among the kernel page tables and modified for mapping".

When an application triggers the kernel to execute a process to release a private memory page, the second level cache only releases the site corresponding to the private virtual address segment, and does not release the physical page. Only when the application on the page table stops operating, can the privileged process release resources. In the process of release, modification to the page table still follows the principle that "when the process in the kernel system needs to modify the mapping relationship of the kernel address spaces, the corresponding page table has to be found among the kernel-page-table page tables and modified for mapping".

According to a preferred mode, the private memory management module is configured to: use the two-level cache design to unmap a 2MB huge page from a linear physical address segment of the kernel system, and partition the huge page into 512 regular pages so that each said regular page is for a said application to use; use the means of stacked management to define a fixed kernel address zone in each said kernel address space, so that each said application independently and exclusively uses this zone as a private memory reading site, and so that the private data and the mapping relationship related to one said applications are transparent to any other said application; and use the auxiliary page table design to make each said non-privileged page table acquire a limited physical memory view that does not contain any said private data, and endow the privileged page table with a complete physical memory view, thereby making the private memory of each said application compatible to capability of other sub-systems of the kernel system.

By combining two-level cache design, means of stacked management, and auxiliary page table design, the present disclosure achieves isolation of memory views between the privileged page table and non-privileged page tables while ensuring exclusive allocation of private memories, thereby protecting data security. Meanwhile, since the private memories can use general IO capability of the kernel system, compatibility is enhanced.

According to a preferred mode, data and view protection for anonymous pages related to the processes, anonymous pipes related to the applications, and private file systems related to the applications can be achieved by means of:

as for anonymous page isolation, directly replacing a path for allocating each said anonymous page in the kernel system with an interface for allocating a first level cache in each said private memory; in respect of anonymous pipe isolation, performing page allocation on a ring buffer of each said anonymous pipe using an interface function for allocating a second level cache of a said private memory; and as to private file system isolation, providing a private file system based on isolation among memory views of the multi-page-table kernel system, and accessing the private file system using a shared host root directory, so that views and data in the private file system related to one said page table are completely isolated from and transparent to any other said page tables.

With provision of the page table management module and the private memory management module, the present disclosure can implement anonymous page isolation protection, anonymous pipe isolation protection, and private file system isolation protection, so as to protect data from data breach caused by arbitrary read attacks on kernel address space and privilege escalation attacks.

As the second aspect of the present disclosure, a system for kernel data isolation based on multiple kernel page tables is disclosed, which includes a page table management module and a private memory management module.

The page table management module is used for classifying each process in the system as either a customizer or a customizee, and classifying each said page table as either a privileged page table or a non-privileged page table, wherein the privileged page table is mapped with privileged codes for a said customizer to use to generate, destroy and customize a said page table, and to place the page table into a page table pool; and each said non-privileged page table does not contain any of the privileged codes for page table operations and does not contain any function or interface related to page table customization, so as to prevent escape from the non-privileged page tables caused by a control flow hijacking attack.

The private memory management module combines a two-level cache design, a means of stacked management and an auxiliary page table design, wherein the private memory management module achieves isolation of private memory views among the page tables by making each said page table exclusively use a fixed segment of a virtual address space and implement dynamic mapping.

As the third aspect of the present disclosure, a storage medium is provided for storing a computer program that makes an electronic device execute the above-mentioned method for kernel data isolation based on multiple kernel page tables.

As the fourth aspect of the present disclosure, a computer program product stored in a computer-readable medium is disclosed, wherein the computer program product includes a computer-readable program, so that when being executed on an electronic apparatus, the computer-readable program implements the above-mentioned method for kernel data isolation based on multiple kernel page tables.

The disclosed method and system for kernel data isolation based on multiple kernel page tables may provide the following effects and advantages:

(1) The multiple kernel page-table design of the present disclosure provides switch paths among key modes in the system, like system calls and processes without adding introduction costs and depending on any special hardware property, making it more efficient than the known unified kernel address space design;

(2) In virtue of the caches of two levels, the configured private memory allocator is more efficient than normal kernel memory allocators, so the overall performance for executing applications is higher than the native performance of a Linux kernel. In addition, the private memory possesses IO compatibility and supports swap in and swap out of private memories in case of insufficient memory; and (3) Since the context of the current application process are not mapped with any private data of other applications, and the private data of the current application are only mapped in the current context, the present disclosure supports defense against attacks that work by reading kernel address spaces (e.g., private file reading after privilege escalation attacks, kernel mode Spectre attacks, etc.).

DETAILED DESCRIPTION OF THE APPLICATION

Figure 1:
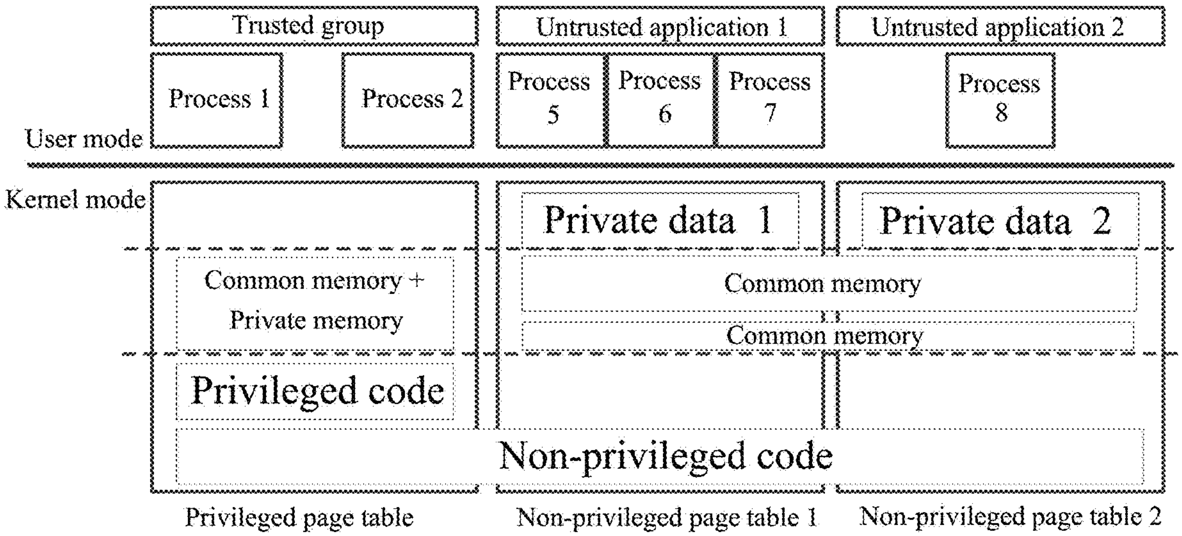
FIG. 1 is an overview of kernel address spaces during operation of the method according to a preferred mode of the present disclosure.

The following description will be directed to some preferred embodiments as depicted in the accompanying.

First of all, some terms involved in the embodiments of the present disclosure should be explained to facilitate understanding by those skilled in the art.

Page: in modern operating systems, a kernel usually organizes physical memories in the unit of "pages." Particularly, all physical memories are divided into a series of pages of the same size, which is typically 4KB.

Address space: in modern operating systems, a kernel has to provide every process with an abstraction. It uses MMU hardware and page tables to virtualize a series of linear addresses for processes in which programs can execute instructions and store data. The address space of one process contains no data or codes of other processes. Different address spaces are isolated from each other.

Page table: this is where correspondence between the virtual address and the actual physical address of a process is recorded. Every process has a corresponding page table that is placed into the MMU during operation of the process so as to help the process with address translation (converting the virtual address of the process into the physical address and reading data from the memory). Since a virtual address space is usually huge, its page table is often organized as a multi-level tree. Taking a 48-bit address space for example, the page table is usually a tree having a depth of 4, wherein every node has 512 leaf nodes.

Kernel address space: in modern operating systems, to protect the kernel infrastructure against user-application attacks, a kernel splits a whole 48-bit virtual address space into a user address space and a kernel address space, which implement mutual communication and protection through hardware mechanisms. For example, a user mode application may enter the kernel through a system call, and before it enters the kernel, the application running in the user mode is prevented from directly reading information from the kernel address space due to hardware restrictions. A kernel address space is where an application operates. This space is mapped with kernel codes and all physical memories, peripheral interface, etc., for the kernel to unifiedly manage and access. In all existing OS kernel designs, the kernel address spaces are consistent across all processes. This ensures consistency of the system despite of processes, so that various synchronization mechanisms of the kernel can be accomplished, thereby maintaining consistency and integrity of the system.

Arbitrary read attack on kernel address space: since a user mode application is prevented from directly accessing memories in a kernel address space, information in the kernel is normally secured from breach. However, a user mode application can somehow read data from an arbitrary address space of the kernel after entering the kernel, and such an attack is called an arbitrary read attack on kernel address space.

Privilege escalation attack: a kernel usually limits access of a process to particular resources, such as IO, files, etc., by setting the authority of the process. Some attacks may break the authority-based limitation and allow user applications to read files, thereby causing data breach.

Private memory allocator: the term herein refers to a memory allocator that allocates private memories.

Anonymous page: during operation, a user application needs a memory to place its intermediate data. Since such a memory is not specific to a certain file, it is called an anonymous memory, or an anonymous page.

Anonymous pipe: pipe communication is a commonly used inter-process communication means for a Linux kernel. It supports data transmission between any two processes. When data transmission happens between two processes without parent-child relationship, the receiving end needs to identify the relevant pipe by its name. For this reason, such a pipe is usually denominated for convenient search. As to communication between processes having strong parent-child relationship, the relevant pipe can be easily identified without using a name, so a communication pipe between parent and child processes is called an anonymous pipe. An anonymous pipe can only be used for communication between parent and child processes.

Private file system: the term herein refers to a special mechanism that makes a file system private exclusive to only one application.

At the granularity of applications: an application usually has plural processes that cooperate to make the application work, and the number of the processes can increase or decrease during operation of the application.

Direct linear memory map (DMM): DMM is a virtual address segment in a kernel address space, and is mapped with the entire of physical memories, so that the kernel can easily access and manage any of the physical memories.

Data isolation: the presence of a DMM zone gives a user application a chance to read data in the DMM zone through arbitrary read attacks on kernel address space and privilege escalation attacks and get information from arbitrary physical memories in the system. To prevent this serious threat to data security, a kernel needs to implement data isolation.

mfork: the term refers to a system call specific to the present disclosure. It is different from a regular system call fork for the fact that the kernel address space of a child process generated using the system call mfork is synchronized with the new kernel page tables, thereby being isolated from the main kernel page tables. In the disclosed system, mfork is usually used by a trusted management process to start the first root process for an untrusted application. Afterward, as the root process continuously generates child processes, all the child processes related to this untrusted application are automatically taken into control of new kernel page tables. In addition to regular parameters of the system call fork, mfork further needs a parameter that represents the serial number of the kernel page-table instance to guide the system to find the corresponding page table.

mfork process: a mfork process is herein an execution process of the system call mfork in the present disclosure.

Preferably, the present disclosure may be sued in any 64-bit X86 processor or 64-bit RISC-V processor that has an MMU (memory management unit).

Embodiment 1

According to a preferred mode, a method for kernel data isolation based on multiple kernel page tables is provided, wherein multiple kernel page tables are created in a kernel system, and each specific application is bound to a corresponding said page table for operation, so that kernel address space of each internal process of the application remains consistent with the corresponding page table, and the kernel address spaces of different applications are isolated from each other due to existence of the different page tables. With the foregoing configuration, the present disclosure allows an application to hide its private data in a page table for its exclusive use and enables data isolation among applications, thereby accomplishing kernel data isolation at the granularity of applications, with low costs, and of high compatibility. FIG. 1 is an overview of kernel address spaces during operation of the method according to a preferred mode of the present disclosure.

Preferably, as compared to the known Linux monolithic kernel operating with globally unified kernel address spaces and a single kernel page-table, the present disclosure allows a multi-page-table kernel to dynamically generate plural kernel page tables during operation by creating plural kernel page tables, so that every untrusted application operates on a respective page table, thereby achieving data isolation at the granularity of applications and at the level of kernel address spaces.

Further, in the present disclosure, for kernel data isolation, kernel page tables may be configured as follows:

- when a process in the kernel system needs to copy mapping relationship of the kernel address spaces (e.g., creation of kernel page tables for child process, synchronization of mapping relationship of the vmalloc memory allocators, etc.), among the kernel page tables, the corresponding page table has to be found to copy; and
- when the process in the kernel system needs to modify the mapping relationship of the kernel address spaces (e.g., using a system call to trigger a vmalloc allocator to perform allocation, etc.), among the kernel page tables, the corresponding page table has to be found to conduct mapping modification.

Preferably, each said process in the kernel system is classified as either a customizer or a customizee, and each said page table is classified as either a privileged page table or a non-privileged page table. The privileged page table is mapped with privileged codes for a said customizer to use to generate, destroy and customize a said page table, and to place the page table into a page table pool. Each said non-privileged page table does not contain any of the privileged codes for page table operations and does not contain any function or interface related to page table customization, so as to prevent escape from the non-privileged page tables caused by a control flow hijacking attack.

Preferably, in the present disclosure, processes classified as customizers are processes trusted by the system. They operate in the privileged page table, and have global physical memory views and complete function feature views (including privileged codes). Generally, after the system starts, all the processes that are not applied with isolation are trusted processes, and all kernel threads are trusted processes. A trusted process is allowed to add a new page table to the page table pool using the privileged code, and is allowed to activate an untrusted application and apply isolation to it (making it operate with a page table bound thereto).

Preferably, in the present disclosure, processes classified as customizees are processes not trusted by the system, and are all processes controlled by untrusted applications (or third-party applications). A customizee has to be activated by a customizer to operate on a non-privileged page table. The non-privileged page table only contains private data related to the current application, global data, and non-privileged codes (i.e., all codes other than privileged codes). A process classified as a customizee cannot escape from its page table until it exits, and it is impossible for a customizee to change its page table midway during operation.

Preferably, in the present disclosure, each process in the kernel system is classified as either a customizer or a customizee. A customizer has its kernel address space mapped with complete physical memories and privileged codes. A page table corresponding to this address space is called a privileged page table. A customizer may use these privileged codes to generate non-privileged page tables and bind the page tables to the customizees. A customizee, as a process controlled by a third-party application not trusted by the system, needs to be activated by a customizer and is restricted to operate on a non-privileged page table that is not mapped with privileged codes and the private data of other applications.

Preferably, in the present disclosure, creation and management of multiple kernel page tables may be accomplished by configuring a page table management module. Therein, the page table management module ensures inescapability of non-privileged page tables and uniformity of private data views within an application by determining privilege levels of individual page tables in the system, and combining ranking of corresponding kernel functions. It thus prevents the multi-page-table mechanism from impacting semantics and normal capability of rows of original system calls in the kernel, so as to allow applications to operate in a multi-page-table kernel without any modification and compilation.

The present disclosure introduces a property of multiple kernel page tables into a Linux kernel by modifying Linux kernel codes, and accomplishes implementation of a multi-page-table kernel. The kernel before modification is a standard Linux 5.4.221 kernel, and the kernel after modification is endowed with a multi-page-table property. The characteristics and distinction of the modified kernel include: (1) codes in the kernel include privileged codes and non-privileged codes; (2) after the kernel starts, there are an auxiliary page table and plural dynamically generated non-privileged page tables in the system; (3) during operation of the kernel, all physical memories are divided into a limited memory view and private memory views maintained by plural non-privileged page tables, respectively, which means that "the complete physical memory view=the limited memory view+n private memory views"; and (4) during operation of the kernel, a private memory allocator (private-vmalloc) is exposed to other functional sub-systems in the kernel, so as to use the multi-page-table property to protect the application-specific private data generated by other sub-systems in the kernel. The private memory allocator hides each private memory in a fixed address segment of the kernel page table corresponding to the relevant application, thereby allocating sub-systems of the kernel with protected memories. When the private memory allocator has insufficient memory capacity, some memories in the limited memory views are transformed into private memories for pooling management and allocation. These memories will be unmapped from the limited memory views. The privileged page table maintains the complete physical memory view throughout the whole process.

Preferably, the privileged page table may contain a global memory view, privileged codes, and non-privileged code. Therein, the global memory view is mapped with all physical memories in the system.

After the system starts, all processes operate in the privileged page table by default as system management processes. These processes include: kernel threads (e.g., ksoftirq, kswapd, etc.) for implementing IO capability; system daemon processes for performing activities like system performance monitoring; and management processes for managing works related to all untrusted applications in the system, like activation and retirement. The system kernel thread provides the private memory of each application with IO capability using the global view. The management process uses the privileged codes to implement generation and destruction of non-privileged page tables, as well as binding operation between an application and its corresponding non-privileged page table.

Preferably, in the present disclosure, the privileged codes and non-privileged codes are also stored in the global memory view.

Preferably, privileged codes are a set of functions selected from the kernel modified according to the present disclosure, including a function for generating page tables, a function for destroying page tables, and the function Mfork. Therien, Mfork is used to bind an application to a designated non-privileged page table, and to activate the application with the corresponding non-privileged page table loaded.

Preferably, the privileged codes are stored in a privileged code segment, which immediately follows the Linux kernel code segment. During compilation of the kernel codes, the compiler places codes generated by privileged codes marked with special marks into this code segment. Since the privileged codes can directly operate page tables, abuse of these codes can damage isolation. Therefore, all non-privileged page tables are not mapped with these codes.

Preferably, the non-privileged codes include the original functions of the kernel before modification and a further set of functions of the kernel after modification according to the present disclosure. Therein, the further set of functions may include a function for process page table exit, a function for forcing inheritance of page table, and interface functions. Further, the function for process page table exit can reduce the reference count of the page table. The function for forcing inheritance of page table can increase the reference count of the page table, and directly copy the top-level page table entries (PGD) in the kernel address space of the corresponding page table to a corresponding site in the page table of a new process. The private memory allocator interface function may be used to allocate private memories to other functional sub-systems (e.g., the virtual file system VFS, etc.) of the kernel. Preferably, the non-privileged codes are stored in the Linux kernel code segment. During compilation of the kernel codes, the compiler places kernel function codes that are not marked as privileged into this segment by default.

Preferably, the auxiliary page table only contains a limited memory view, and is a kernel page table exclusive to the kernel after modification according to the present disclosure. During activation of the system, an auxiliary page table is created immediately after the privileged page table has been created. It maps all physical memories by re-allocating and constructing all page table entries of Linux four-level page tables (e.g., the top-level page directory PGD (Page Global Directory), the upper-level page directory PUD (Page Upper Directory), the intermediate page directory PMD (Page Middle Directory), and the final page directory entry PTE (Page Table Entry)). The auxiliary page table and the privileged page table have different directory entries of all four levels in the four-level page tables. Therefore, the unmapping performed in the auxiliary page table will not have impact on the mapping result in the privileged page table. During creation of the auxiliary page table, since the private memory has not been used by any untrusted application in the system, the limited memory view is equal to the complete physical memory view. Therefore, the auxiliary page table at this time is still mapped with the complete physical memory view. Then after the system keeps allocating private memories, the limited memory view is continuously narrowed, and the physical memory mapping scope of the auxiliary page table will become smaller than the privileged page table.

Preferably, a non-privileged page table contains non-privileged codes, limited memory views, and application-specific private memory views. Therein, about the non-privileged page tables, (1) they are generated using the privileged code root-init and destroyed using the privileged code root-exit; (2) during generation of a non-privileged page table, the PGD corresponding to the address segment of the limited memory view directly copies the PGD at the corresponding site in the auxiliary page table, so as to ensure consistency with the auxiliary page table in terms of limited memory view; and (3) the private memory views of the application are created and maintained by the private memory allocator.

Figure 2:
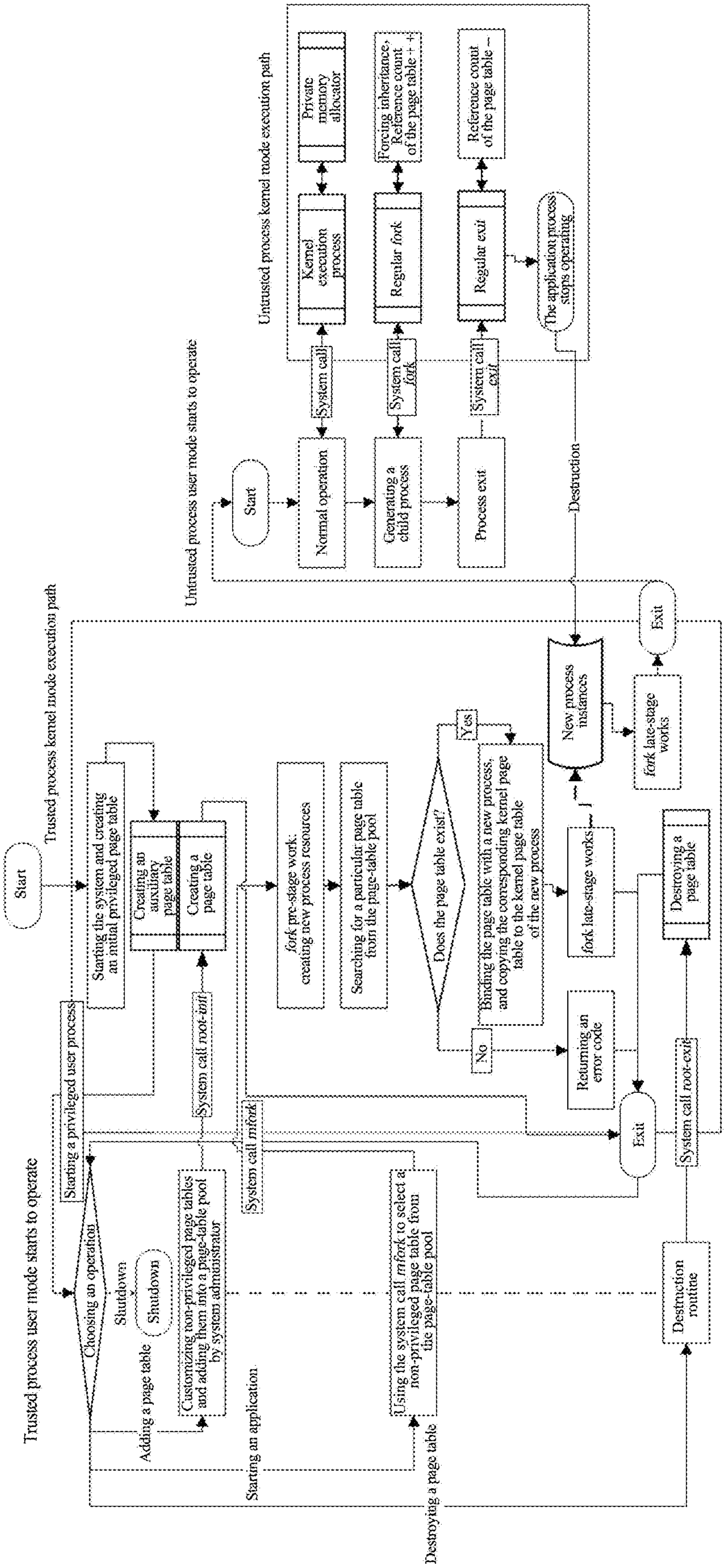
FIG. 2 is a detailed flowchart of a page table management module according to a preferred mode of the present disclosure.

Preferably, as shown in FIG. 2, the page table management module may work through the following typical workflow.

In S1.1, when the system is booted, a kernel page table is constructed for the kernel through regular procedures, and all initial processes are taken as customizers to operate in the initial kernel page table, so that the initial kernel page table is the only privileged page table in the system.

In S1.2, after S1.1, an auxiliary page table is created by reconstructing linear memory maps (i.e., reconstructing page tables for all four levels), and initialization is conducted as normal. After the system has started, the kernel starts to execute the first privileged user process so that the process comes into the user mode for execution.

In S1.3, when the system administrator uses a trusted process to choose an operation, if the operation is shutdown, the workflow jumps to S1.14; if the operation is adding a page table, the workflow jumps to S1.4; if the operation is starting an application, the workflow jumps to S1.5; or if the operation is destroying a page table, the workflow jumps to S1.6.

In S1.4, the privileged page table contains privileged codes for the customizers to use to create page tables, thereby achieving isolation among applications. A customizer may use the privileged system call function "root-init" to generate a page table instance and place it into the page table pool for an activated application to use. The system administrator customizes non-privileged page tables and place them into the page table pool. A trusted process enters the kernel mode for execution, and then returns to the user mode, the workflow jumps to S1.3.

In S1.5, a customizer operating in the privileged page table starts the root process of the application (i.e., the first process of the application). The root process of the application is bound to a page table using the system call mfork, thereby forcing the root process of the application and child processes generated after the root process to operate in the page table. The system administrator selects a non-privileged page table from the page table pool to activate the initial process of the application. The trusted process then enters the kernel mode for execution, and the workflow jumps to S1.7.

In S1.6, the management process operating on the privileged page table can use the privileged system call function "Page Table Destroying" to release a page table from the page table pool. The system administrator starts the destruction routine. The trusted process then enters the kernel mode for execution, and the workflow jumps to S1.11.

In S1.7, the trusted process kernel mode uses the added privileged system call mfork to start the application process to create new process resources and search for a particular page table from the page table pool. If the page table exists, the workflow jumps to S1.8. If the page table does not exist, the workflow jumps to S1.10.

In S1.8, the trusted process in the kernel mode uses mfork to bind the page table with the new process. This is achieved by: 1) copying the corresponding kernel page table to the kernel page table of the new process; 2) copying page table instance pointer to the corresponding field in the structure task_struct; and 3) adding one (1) to the reference count of the page table, and afterward executing fork late-stage works to generate a new process instance. If the new process is generated successfully, it waits to be activated as scheduled by the system. When the workflow of mfork finishes, the system returns to the user mode and the workflow jumps to S1.3.

In S1.9, as scheduled, the new process instance operates, and the workflow jumps to S1.12.

In S1.10, the trusted process kernel mode returns an error code and exits. The workflow jumps to S1.3.

In S1.11, the trusted process kernel mode uses the added page-table management system call root-exit to destroy the page table and exits. The workflow jumps to S1.3.

In S1.12, the untrusted process user mode starts to operate. The normal operation follows the principles below.

When any process of the application calls fork to generate a child process, it has to follow the principle that "when a process in the kernel system needs to copy the mapping relationship of the kernel address spaces, among the kernel page tables, the corresponding page table has to be found to copy", and uses a non-privileged interface function to force the child process to inherit the page table of the parent process. It synchronizes the page table to the kernel page table of the child process through mapping, thereby accomplishing generation of the child process.

During operation of the application, some kernel execution paths (e.g., anonymous pipe allocation, anonymous page allocation, and private file system page cache allocation) can trigger and use the private memory allocator. The kernel uses the non-privileged interface function of the private memory allocator to allocate a private memory to the application. The private memory allocator modifies mapping of the kernel address space according to the principle that "when the process in the kernel system needs to modify the mapping relationship of the kernel address spaces, the corresponding page table has to be found among the kernel page tables and conducted mapping modification."

When a non-privileged process exits the system, it has to use a page table exit interface, thereby reducing the reference count of the page table. At this time, the process page table is released directly and no operations have to be performed on the page table.

In S1.13, the application process stops operating, and the corresponding process instance is destroyed.

In S1.14, the system shuts down and the workflow ends.

Preferably, for a modern operating system, in the starting stage, after the kernel is started and configured, a system process has to be executed as the first process of the entire system. A writer of a distribution writes the details of this process, and places them in the form of a binary executable file into the root directory of the file system. The Linux kernel then finds the binary executable file for this process in the file system through a predetermined path and executes this program. Afterward, all processes generated in the system are children processes or grandchildren processes of this process.

Preferably, in S1.4, the privileged kernel interface function compiles the link by:

S1.4.1, adding a segment in the kernel link script, aligned on 2 MB;

S1.4.2, marking all privileged codes with macro, and making the linker place these marked functions into the segment as described in S1.4.1; and S1.4.3, during construction of the privileged page table, mapping the corresponding segments as described in S1.4.1 in a non-global manner; and during construction of the non-privileged page tables, unmapping the corresponding segments as described in S1.4.1.

In order to prevent the non-privileged page tables from escape caused by control flow hijacking attacks, the present disclosure collectively stores all privileged system calls and interface functions in kernel codes in a fixed kernel code zone address space, and unmaps this zone in all non-privileged page tables. By doing so, every control flow hijacking attack from a non-privileged page table will trigger a kernel page fault, so that the attack is intercepted. With the foregoing flow, all non-privileged applications operate in limited kernel address spaces and are prevented from acquiring the private data of other applications, thereby ensuring data security among applications.

Preferably, the step S1.6 involves an operation of destroying page tables that is unique to the present disclosure, and the operation is to destroy a page table instance during page table management. This is achieved using the system call "root-exif" proposed in the present disclosure. Therein, the steps are: 1) releasing page table mapping in the page tables level by level (including the page tables of all four levels); 2) releasing structures related to management of second level cache in the private memories; 3) releasing physical pages of the private memories and returning them back to the first level cache; and 4) ending. The page table instances to be destroyed may be selected as below. It is necessary to ensure that there is not any application process using this page table instance. Particularly, this is when the reference count of the page table instance is 0. If the count is zero, release can be performed. If the count is not zero, it indicates that an application process is now operating thereon, and the application or the process has to be ended or killed before the page table instance can be released.

Figure 3:
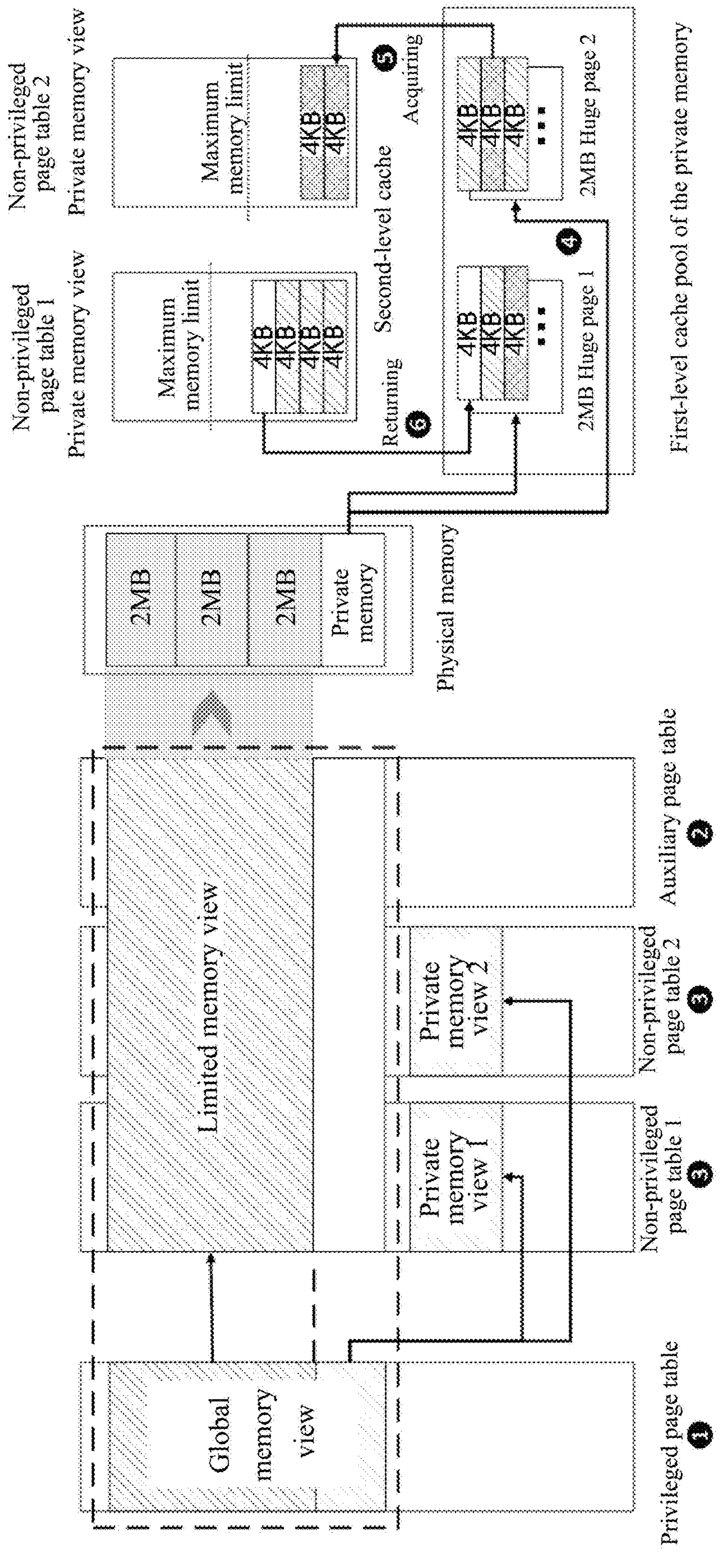
FIG. 3 is a detailed design chart of a private memory management module according to a preferred mode of the present disclosure.

Preferably, as shown in FIG. 3, the private memory allocator may be such configured that by combining two-level cache design, stacked management, and auxiliary page table design, it achieves isolation of memory views between the privileged page table and non-privileged page tables while ensuring exclusive allocation of private memories, thereby protecting data security. Meanwhile, since the private memories can use general IO capability of the kernel system, compatibility is enhanced.

Preferably, the two-level cache design requires 2 MB huge pages from buddy systems in one sitting, and divides every huge page into 512 4 KB-pages for individual applications to use. By doing so, the linear memory map of the kernel address space memories can keep the 2 MB huge-page mapping at the maximum possibility while being compatible with the allocation granularity of 4 KB private memory pages.

Further, since in most modern operating systems the linear physical memory map of the kernel uses huge-page mapping (e.g., mapping at 2 MB granularity) to speed up kernel access, fining this granularity can introduce a 2%-10% performance cost. For bridging the gap between 2 MB and 4 KB allocation without introducing this cost, the present disclosure adopts a two-level cache mechanism. Specifically, the first level cache is a global cache for private memories, and it ensures that every 4 KB private memory is allocated uniquely. The second level cache is a local cache within a page table. It may be preset through the privileged allocation interface of the private memory allocator during creation of a page table, or may be allocated using a non-privileged allocation interface during operation of an application.

Preferably, the stacked management involves reserving a fixed kernel address zone (private-vmalloc) in a kernel address space and making each application can independently and exclusively use this zone as its private-memory reading site, so that the private data and mapping of one application are transparent to another application.

Further, use of the private memories has to be transparent, which means that one page table cannot perceive existence of the private memory of another page table at the level of address spaces. Therefore, according to the present disclosure, a fixed address zone (private-vmalloc) is reserved in the kernel for storing the private memories of all applications. It is to be noted that every page table uses this zone to dynamically map the private memory exclusively, so that the mapping views of the private memories of different page tables are completely transparent to each other.

Preferably, the auxiliary page table can reconstruct the whole linear physical memory map during the starting stage of the system. This is for preventing mutual access between the privileged page table and non-privileged page tables in which applications are located so that all kernel driving threads can acquire the complete physical memory, thereby allowing a private memory for an application to access IO operations (e.g., swap-in and swap-out) without exposing its data to other applications.

Further, the private memories have to be operatable to other sub-systems in the kernel, such as swap-in or swap-out. However, unmapping a private memory from the linear physical-memory map can prevent IO threads of the kernel from accessing these memories. In order to enable various IO operations and satisfy needs for general data transmission, the present disclosure proposes an auxiliary page table design based on a multi-page-table framework. Specifically, the auxiliary page table design involves adding an auxiliary page table to separate the privileged page table from all non-privileged page tables in terms of memory view. As a result, a non-privileged page table can only access the linear physical-memory map in which private memory mapping has been removed. On the other hand, the privileged page table is mapped with the complete linear physical-memory map, and thereby obtains the complete memory view of the system. Based on this design, all kernel threads are operated on the privileged page table and allowed to access the private memories, thereby allowing the private memories to access general IO capability.

Preferably, the private memory management module can execute the following workflow.

In S2.1, the system starts, and an initial privileged page table is created.

In S2.2, the system creates an auxiliary page table, and page table mapping of the linear memory map is reconstructed.

In S2.3, the management process constructs non-privileged page tables. Therein, the linear physical memory map of a non-privileged page table directly copies the mapping relationship in the corresponding zone of the auxiliary page table. The management process may further allocate a certain size of private memory for an application from the first level cache in advance according to application properties for the page table to conduct mapping, thereby speeding up memory allocation at the initial stage after the application is activated. The management process has to set an upper limit of the private memory that can be used by a page table. The management process enables isolated operation of the application.

In S2.4, for the first level cache, when it is called by the second level cache or the management process for allocation, the private memory management module checks whether the huge pages in the first level cache have an idle 4 KB page. If there is not any idle page, the first level cache allocates a 2 MB huge page through the kernel buddy system. Then the allocated 2 MB huge page is unmapped from the auxiliary page table. In the privileged page table, the page table entry at the corresponding location is marked as non-global. After allocation of the 2 MB huge page finishes, the first level cache performs management and allocation using a 512-bit bitmap.

In S2.5, the application triggers allocation of a private memory through a kernel execution path. When the second level cache private to the application is exhausted and needs to be expanded, a private physical page is acquired by calling the first level cache, so that the physical page is mapped into the private-vmalloc address zone of the page table. The page table entry is marked as non-global. Modification to mapping follows the principle that "when the process in the kernel system needs to modify the mapping relationship of the kernel address spaces (e.g., using a system call to trigger a vmalloc allocator to perform allocation, etc.), among the kernel page tables, the corresponding page table has to be found to conduct mapping modification".

In S2.6, when the application triggers the kernel to release a private memory page (e.g., release of any pipe), the second level cache only releases the corresponding site in the private virtual address segment and does not release the physical page. Only when the application on the page table stops operating, and the page table is returned to the page table pool, will the privileged process release and clean the private physical page in the page table. During release, modification to the page table still follows the principle that "when the process in the kernel system needs to modify the mapping relationship of the kernel address spaces (e.g., using a system call to trigger a vmalloc allocator to perform allocation, etc.), among the kernel page tables, the corresponding page table has to be found to conduct mapping modification".

Figure 4:
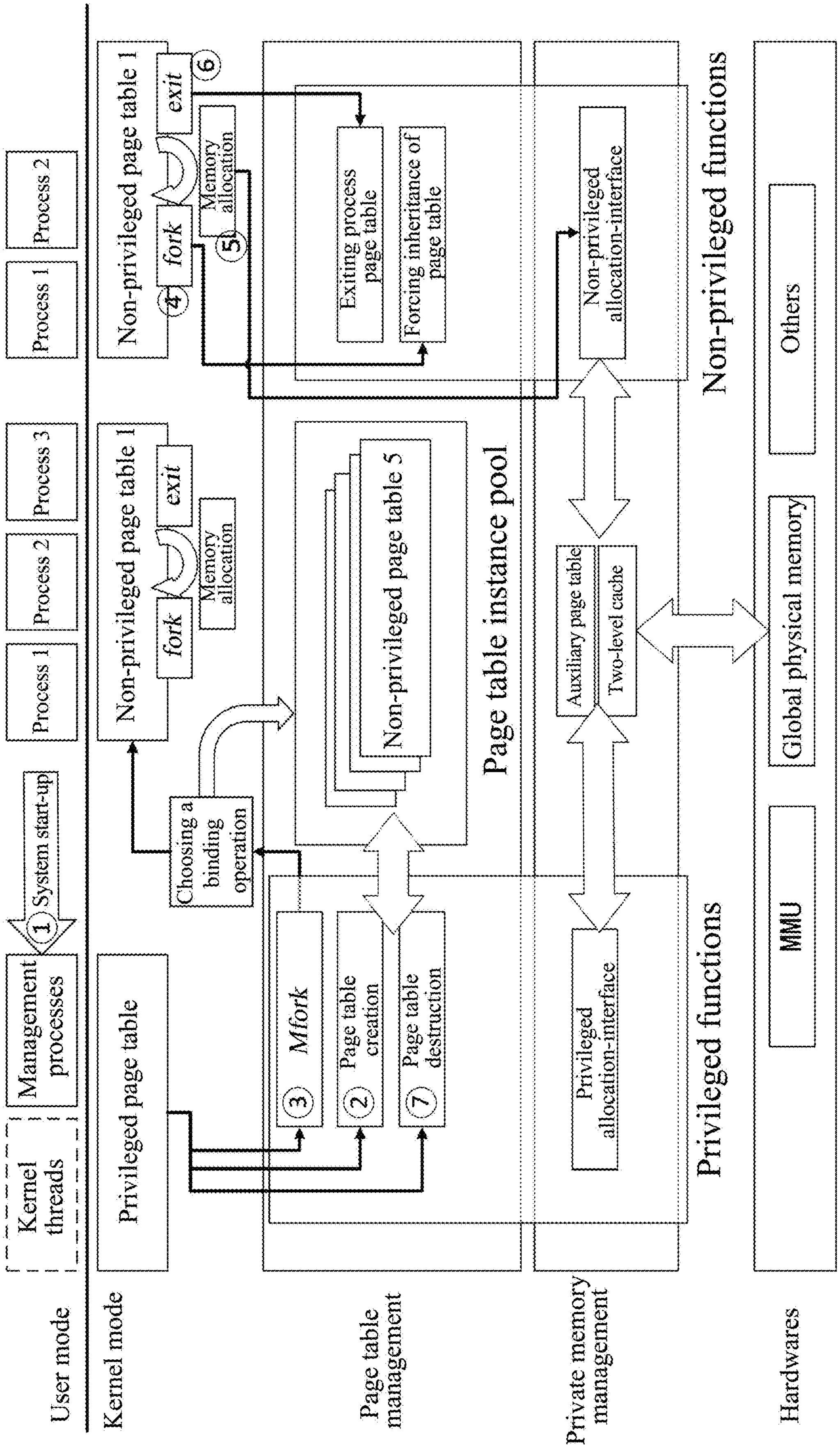
FIG. 4 is a functional module diagram of the system according to a preferred mode of the present disclosure.

According to a preferred mode, as shown in FIG. 4, the present disclosure provides a system for kernel data isolation based on multiple kernel page tables, which comprises the page table management module and the private memory management module as described previously.

Specifically, the hardware of the system of the disclosure includes a central processing unit (CPU), a random access memory (RAM) and a cache.

The central processing unit (CPU) interacts with the memory (RAM) through a memory management unit (MMU). The memory management unit (MMU) is responsible for converting virtual addresses into physical addresses and accessing appropriate memory locations.

The cache is divided into multiple levels, usually integrated into the central processing unit (CPU), and has a high-speed connection to the core of the central processing unit (CPU). That is, the central processing unit (CPU) directly integrates a cache with multiple levels ($L_1$, $L_2$, $L_3$) and connects to it through a dedicated bus and control logic. The central processing unit (CPU) directly accesses the cache levels ($L_1$, $L_2$, $L_3$) of the cache to obtain instructions and data at the fastest speed. The cache pre-fetches or writes back data from the memory (RAM) to reduce memory access latency. When the central processing unit (CPU) needs to read data from the memory (RAM), it first checks whether the data is available in the $L_1$ cache; if not, it checks the $L_2$ cache and $L_3$ cache, and finally accesses the memory (RAM). This process is called a cache hit or miss. When a cache miss occurs, data can be loaded from the main memory (RAM) into the cache and then accessed by the central processing unit (CPU). The cache is sometimes used as a fast access storage for page table data to increase the speed of page table lookups.

The connection between the cache and the main memory (RAM) requires a cache consistency protocol to maintain data consistency and ensure data synchronization between various cache levels and main memory.

The hardware performing the tasks of the page table management module includes a central processing unit (CPU) and memory (RAM), responsible for address translation and page table management, executing privileged and non-privileged system calls, and participating in the creation, update and destruction of page tables.

The hardware performing the tasks of the private memory management module includes memory (RAM) and cache. Preferably, the page table management module and the private memory management module use the same physical memory resource through memory (RAM), but manage the memory (RAM) through different mechanisms: the page table management module focuses on address translation and process isolation, while the private memory management module focuses on the exclusivity of memory allocation and data security.

The page table management module uses the division of privileged and non-privileged page tables to protect the security of memory (RAM) access. The private memory management module uses cache and address space isolation mechanisms to ensure the security of application data.

The hardware operation steps of the workflow of the page table management module are as follows.

S3.1: When the system starts, the central processing unit (CPU) initializes the kernel through the memory management unit (MMU) and builds the kernel page table according to the normal process. The page table is stored in the memory (RAM) and used as a privileged level page table for the system. The cache ($L_1$, $L_2$, $L_3$) speeds up the access to the page table data in this process, ensuring that the initial process can be read and executed quickly.

S3.2: When the system completes S3.1, the central processing unit (CPU) creates an auxiliary page table through the memory management unit (MMU) and rebuilds the linear mapping area. The reconstruction of the four-level page table ensures the complete mapping of virtual addresses to physical addresses. At this point, the central processing unit (CPU) quickly completes the initialization of the page table with the support of the cache and continues to execute the first privileged user process.

S3.3: The system administrator selects operations on the central processing unit (CPU) through a trusted process. If it is decided to shut down, go to S3.14, the CPU stops all processes; if chosen to add a page table, go to S3.4, the CPU will update the page table pool; if chosen to start an application, go to S3.5, the CPU schedules the new application process to start; if chosen to destroy the page table, go to S3.6, the CPU releases the page table resources.

S3.4: The code in the privileged page table is executed by the central processing unit (CPU) to create page tables and isolate applications for the customizer. The customizer generates a page table instance through the "root-init" privileged system call, and the memory management unit (MMU) is responsible for managing the storage and access of the new page table in the memory (RAM). The cache speeds up the access to these tables, ensuring system efficiency. After execution, the CPU switches the process back to user mode.

S3.5: With the support of the privileged page table, the customizer starts the root process of the application on the CPU through the mfork system call and binds it to the page table. This step uses the memory management unit (MMU) to manage the address space, and the cache is used to speed up process scheduling. The administrator selects a non-privileged page table from the page table pool, and the central processing unit (CPU) enters kernel mode to execute the initial process of the application.

S3.6: The management process uses the "page table destruction" privileged system call function, and the central processing unit (CPU) releases a page table from the memory (RAM) through the memory management unit (MMU). In this process, the cache consistency protocol ensures data synchronization and consistency. After execution is completed, the central processing unit (CPU) exits the kernel mode.

S3.7: The trusted process kernel mode starts a new application process through the mfork system call. The central processing unit (CPU) creates new process resources in the memory (RAM) and uses the memory management unit (MMU) to locate and bind the page table. If the page table exists, go to S3.8; if not, go to S3.10.

S3.8: In the mfork process, the central processing unit (CPU) copies the corresponding kernel page table to the kernel page table of the new process, updates the task_struct structure, and increases the page table reference count. The cache helps speed up data transmission, and the generated new process instance is ready to execute under the scheduling of the central processing unit (CPU).

S3.9: After the central processing unit (CPU) schedules, the new process instance starts to execute, and go to S3.12.

S3.10: If the page table does not exist, the trusted process kernel mode returns an error code, the central processing unit (CPU) exits the process and goes to S3.3.

S3.11: The trusted process kernel mode destroys the page table through the root-exit call, and the central processing unit (CPU) manages the page table pool. After completion, it exits the kernel mode and goes to S3.3.

S3.12: The untrusted process user state starts to execute, following the fork system call principle. During this process, the central processing unit (CPU) ensures the synchronization of the address space mapping relationship between multiple kernel page tables, and the cache and memory management unit (MMU) ensure data consistency and process isolation. The child process is forced to inherit the page table of the parent process, and the memory management unit (MMU) accelerates the synchronization of page table mapping to the child process kernel page table through cache.

Preferably, the hardware operation steps of the workflow of the private memory management module are as follows.

S4.1: When the system starts, the central processing unit (CPU) uses the memory management unit (MMU) to establish the initial privileged page table. The privileged page table is stored in the memory (RAM), and the cache ($L_1$, $L_2$, $L_3$) speeds up the access to the page table data, ensuring the system can quickly proceed to the next initialization step.

S4.2: When building the auxiliary page table, the central processing unit (CPU) reconstructs the page table mapping of the linear mapping area through the memory management unit (MMU). The caches at all levels reduce the memory access latency, support fast initialization of the page table, and ensure efficient address translation.

S4.3: The management process running on the central processing unit (CPU) builds a non-privileged page table. This process involves copying the linear physical memory mapping area of the auxiliary page table. The management process can pre-allocate private memory from the first-level cache for page table mapping, speeding up memory allocation when the application starts. The central processing unit (CPU) ensures that the allocation of private memory is within specific limits and implements the isolated operation of the application through the cache and page table management mechanism.

S4.4: When the first-level cache is accessed by the second-level cache or the management process, it attempts to allocate a 4 KB page frame from its storage to store data. If there is no available 4 KB page frame in the $L_1$ cache, the central processing unit (CPU) will allocate a 2 MB large page from a higher cache level or memory (RAM), and then divide it into multiple 4 KB page frames for use. This large page will then be removed from the auxiliary page table and marked as non-Global in the privileged page table. The central processing unit (CPU) uses a 512-bit bitmap to manage the allocation of these large pages.

S4.5: When an application requests private memory allocation through the kernel execution path and its second-level cache is exhausted, the application allocates a private physical page from the first-level cache through the memory management unit (MMU) and the page table, and updates the cache. The central processing unit (CPU) maps the private physical page to the private-vmalloc address area of the page table through the memory management unit (MMU) and marks the page table entry as non-Global. Any modification to the mapping follows the principle that "when a process in the system modifies the kernel address space mapping relationship, multiple kernel page tables need to find the corresponding page table for mapping modification"

S4.6: When releasing private memory pages, the application updates the page table and manages physical pages that are no longer needed. The application updates the page table and marks the physical pages that are no longer needed as available. The second-level cache only releases the corresponding private virtual address segment. The privileged process releases these physical pages only when the application stops running and the page table returns to the page table pool. The central processing unit (CPU) is responsible for updating the page table during this process and ensuring that the principle of "when a process in the system modifies the kernel address space mapping relationship, multiple kernel page tables need to find the corresponding page table for mapping modification" is followed. The cache consistency protocol maintains data synchronization between the cache and memory to ensure data consistency.

Further, with provision of the page table management module and the private memory management module, the present disclosure can implement anonymous page isolation protection, anonymous pipe isolation protection, and private file system isolation protection, so as to protect data from data breach caused by arbitrary read attacks on kernel address space and privilege escalation attacks. Specifically, protection means may include:

anonymous page isolation: directly replacing a path for allocating each said anonymous page in the kernel system with an interface for allocating a first level cache in each said private memory; anonymous pipe isolation: performing page allocation on a ring buffer of each said anonymous pipe using an interface function for allocating a second level cache of a said private memory; and private file system isolation: providing a private file system based on isolation among memory views of the multi-page-table kernel system, and accessing the private file systems using a shared host root directory, so that views and data in the private file system related to one said page table are completely isolated from and transparent to any other said page tables.

In the present disclosure, the reason to provide isolation protection to anonymous pages is as below. A process during normal operation needs to call mmap to get a memory for storing operation-related temporary data. Logically, most of these data should not be accessed by the kernel, and these data contain application-related private information (e.g., password-encrypted intermediate computing data).

Further, in order to achieve swap-in and swap-out for anonymous pages, the present disclosure implements a lru swap-in and swap-out queue in the first level cache of a private memory to maintain swap-in and swap-out of the private memory separately.

Further, in order to satisfy the normal need for accessing and copying anonymous pages when the kernel writes data, the present disclosure provides a scheme for temporarily mapping private memories. The scheme is implemented as below. In the private-vmalloc address zone, temporary anonymous page mapping sockets are provided in quantity that is equal to two times of the number of cores in the CPU. The kernel can temporarily access an anonymous page by simply mapping the page to the corresponding socket in the current CPU. With this design, instead of global refreshing, unmapping and TLB refreshing after access only have to performed in the current CPU. Besides, since the anonymous page is not mapped to the address space of any other page tables throughout the process, security of the private data can be ensured.

In the present disclosure, the reason to isolate anonymous pipes is as below. Anonymous pipes are often used for communication between processes having strong parent-child relationship, so anonymous pipes represent an inter-process communication means within an application. The ring buffer for a pipe to store data is placed in the kernel, and the buffer memory stores private data about internal communication of the application.

Preferably, the working principle of the private file system is as below.

The privileged page table of the system loads a global private file system super block to the root directory, so as to ensure that an application can access its own private file system through the corresponding directory. During generation of every non-privileged page table, a private file system root directory dentry entry has to be initialized in the corresponding private-vmalloc zone in the non-privileged page table. The corresponding page is mapped in a read-only manner. After the non-privileged page table is activated along with the application, for creation of files for this file system, allocation is conducted directly using the private memory second level cache allocator, so as to achieve isolation of the corresponding file contents "page cache".

With this design, since the root directory of the private file system of every application is built in its respective private memory zone and is not accessible in the common memory zone of the kernel, logic views of different private file systems are completely invisible to each other. Even of a malicious application is loaded onto the root directory and traverses the global file system therefrom, it can see nothing more than its own private file system. Tis effectively protects data security of the private file systems against privilege escalation attacks. Moreover, since the file page cache in a private file system is only mapped to the page table of the application, it defends against kernel address space arbitrary read attacks. The present disclosure uses private file systems with overlayfs. Particularly, the upper layer of overlayfs is implemented using private file systems and the lower layer is implemented using normal container mapping, thereby achieving protection of private data for file systems in a container-based environment.

The present disclosure provides a method and a system for kernel data isolation based on multiple kernel page tables to protect application private data at the granularity of applications in a single kernel at very low costs, so as to prevent data breach caused by kernel address space arbitrary read attacks or privilege escalation attacks. In the present disclosure, the page table management module and the private memory management module provided in the kernel data isolation system can define privilege at the level of kernel address spaces, and ensure that private memories among different applications are transparent to each other and that the private memories can access general IO capability. The present disclosure, with the foregoing overall design, based on a multi-page-table kernel, protects anonymous pages and anonymous pipes with isolation, and provides private file systems that are isolated from tach other in terms of both view and data at the level of address spaces.

Embodiment 2

This embodiment is a further improvement on Embodiment 1, and the repeated contents will not be repeated here.

The present disclosure further provides a storage medium for storing a computer program that makes an electronic device execute the method for kernel data isolation based on multiple kernel page tables as described in Embodiment 1.

According to the present disclosure, a computer program product stored in a computer-readable medium is also disclosed, wherein the computer program product includes a computer-readable program, so that when being executed on an electronic apparatus, the computer-readable program implements the method for kernel data isolation based on multiple kernel page tables as described in Embodiment 1.

It should be noted that the embodiments of the present disclosure can be implemented by hardware, software, or a combination of software and hardware. The hardware part can be implemented using dedicated logic; the software part can be stored in a memory and executed by an appropriate instruction execution system, such as a microprocessor or dedicated design hardware. A person of ordinary skill in the art will understand that the above-mentioned devices and methods can be implemented using computer-executable instructions and/or contained in a processor control code, for example, such codes are provided on a carrier medium such as a disk, CD or DVD ROM, a programmable memory such as a read-only memory (firmware), or a data carrier such as an optical or electronic signal carrier. The device and its modules of the present disclosure can be implemented by hardware circuits such as very-large-scale integrated circuits or gate arrays, semiconductors such as logic chips, transistors, etc., or programmable hardware devices such as field programmable gate arrays, programmable logic devices, etc. It can also be implemented by software executed by various types of processors, or can be implemented by a combination of the above-mentioned hardware circuits and software.

It is to be noted that the particular embodiments described previously are exemplary. People skilled in the art, with inspiration from the disclosure of the present disclosure, would be able to devise various solutions, and all these solutions shall be regarded as a part of the disclosure and protected by the present disclosure. Further, people skilled in the art would appreciate that the descriptions and accompanying drawings provided herein are illustrative and form no limitation to any of the appended claims. The scope of the present disclosure is defined by the appended claims and equivalents thereof. The disclosure provided herein contains various inventive concepts, such of those described in sections led by terms or phrases like “preferably”, “according to a preferred mode” or “optional”. Each of the inventive concepts represents an independent conception and the applicant reserves the right to file one or more divisional applications therefor. Throughout the disclosure, any feature following the term “preferably” is optional but not necessary, and the applicant of the present application reserves the rights to withdraw or delete any of the preferred features any time.

What is claimed is:

1. A method for kernel data isolation based on multiple kernel page tables, comprising:

creating multiple kernel page tables in a kernel system, and binding each specific application to a corresponding page table for operation, so that each internal process of the application remains consistent with the corresponding page table in terms of kernel address space, and the kernel address spaces of different applications are isolated from each other due to existence of the different page tables, wherein when a process in the kernel system needs to copy mapping relationship of the kernel address spaces, the corresponding page table has to be found among the multiple kernel page tables and copied, and when the process in the kernel system needs to modify the mapping relationship of the kernel address spaces, the corresponding page table has to be found among the multiple kernel page tables and modified for its mapping; and providing a page table management module that is configured to classify each said process in the kernel system as either a customizer or a customizee, and classify each said page table as either a privileged page table or a non-privileged page table, wherein the privileged page table is mapped with privileged codes for a said customizer to use to generate, destroy, and customize a said page table, and to place the page table into a page table pool; and each said non-privileged page table does not contain any of the privileged codes for page table operations and does not contain any function or interface related to page table customization, so as to prevent escape from the non-privileged page tables caused by a control flow hijacking attack.

2. The method of claim 1, further comprising:

during normal operation of the kernel system, using the page table management module to generate the multiple kernel page tables, so that a management process of the kernel system when starting each said application binds the application to one said kernel page table, wherein all of the internal processes of the application during operation are only allowed to perform kernel synchronization through the corresponding kernel page table.

3. The method of claim 2, wherein each said application hides private data thereof in a private memory of the corresponding page table indirectly using a private memory allocator, so that the private memory of one said page table is completely invisible to the other page tables, wherein the private memory allocator is configured to be a private memory management module that combines a two-level cache design, a stacked management means, and an auxiliary page table design.

4. The method of claim 3, wherein the private memory management module is configured to:

use the two-level cache design to unmap a 2 MB huge page from a linear physical address segment of the kernel system, and partition the huge page into 512 regular pages so that each said regular page is for a said application to use.

5. The method of claim 4, wherein the private memory management module is further configured to:

use the stacked management means to define a fixed kernel address zone in each said kernel address space, so that each said application independently and exclusively uses this zone as a private memory reading site, and so that the private data and the mapping relationship related to one of said applications are transparent to any other said application.

6. The method of claim 5, wherein the private memory management module is further configured to:

use the auxiliary page table design to make each said non-privileged page table acquire a limited physical memory view that does not contain any said private data, and endow the privileged page table with a complete physical memory view, thereby making the private memory of each said application compatible to functional sub-systems of the kernel system.

7. The method of claim 6, further comprising:

achieving data and view protection for anonymous pages related to the processes, anonymous pipes related to the applications, and private file systems related to the applications by means of:

anonymous page isolation: directly replacing a path for allocating each said anonymous page in the kernel system with an interface for allocating a first level cache in each said private memory;

anonymous pipe isolation: performing page allocation on a ring buffer of each said anonymous pipe using an interface function for allocating a second level cache of a said private memory; and private file system isolation: providing a private file system based on isolation among memory views of the multi-page-table kernel system, and accessing the private file system using a shared host root directory, so that views and data in the private file system related to one said page table are completely isolated from and transparent to any other said page tables.

8. A method for kernel data isolation based on multiple kernel page tables, characterized in that the method comprises:

during initial operation process, dynamically generating at least one kernel page table, so as to operate an untrusted application on a respective page table;

dividing the pre-generated page tables into privileged page tables and non-privileged page tables based on the types of system processes, wherein the privileged page table is mapped with a privileged function, and the non-privileged page table does not contain any of the privileged functions; and isolating memory view between the privileged page table and the non-privileged page table while ensuring the exclusive allocation of private memory in a two-level cache manner, in a stacking management manner, and/or by creating auxiliary page tables, wherein the method further comprises:

when the system is booted, running all initial processes in a unique initial privileged page table;

when the customizer activates an untrusted application, binding root process of the untrusted application to the page table; and when any process of the untrusted application uses a system call fork to generate a child process, using a non-privileged interface function to force the child process to inherit the page table from its parent process, and mapping and synchronizing the page table of the parent process to the kernel page table of the child process, thereby completing the generation of the child process.

9. The method of claim 8, characterized in that the method further comprises:

during the operation of the trusted application, when a kernel execution path triggers a private memory allocator, making the kernel use the non-privileged interface function in the private memory allocator to allocate a private memory for the trusted application.

10. The method of claim 9, characterized in that the method further comprises:

when any non-privileged process exits the system, making the process use a page table to exit the interface, so as to reduce the reference count of the page table.

11. The method of claim 10, characterized in that the method further comprises:

allowing a management process running on the privileged page table to use the privileged interface function "Page Table Destroying" to release a page table from the page table pool, after checking if the reference count of the page table instance is zero, and if the reference count is not zero, not to release the page table.

12. The method of claim 11, characterized in that the step of isolating the memory view between the privileged page table and the non-privileged page table while ensuring the exclusive allocation of private memory by creating auxiliary page tables comprises:

after establishing the initial privileged page table, creating auxiliary page tables and reconstructing the mapping of page tables in a linear memory map; and performing the management process to construct the non-privileged page table, wherein the linear physical-memory maps of the non-privileged page table directly copy the corresponding zone mapping relationship of the auxiliary page tables, and the management process is defined with an upper limit for use of the private memory by a page table; thereby the management process enabling isolated operation for the application.

13. The method of claim 12, characterized in that the step of isolating the memory view between the privileged page table and the non-privileged page table while ensuring the exclusive allocation of private memory in a two-level cache manner includes:

making a first-level cache check whether any of its huge pages comprises any idle page, and if not, allocate a large page through a kernel buddy system, unmap the allocated huge page from the auxiliary page tables, and after allocation of the huge page, perform management and allocation through bitmap;

when an application triggers allocation of the private memory through the kernel execution path, and a second-level cache owned by the application needs to be expanded due to exhaustion, calling the first level cache process to map the physical page into the corresponding address zone of the page table; and when the application triggers the kernel to execute a process and release a private memory page, making the second-level cache only release the site corresponding to the private virtual address segment, wherein only when the application on the page table stops operating, can the privileged process release resources.

14. A system for kernel data isolation based on multiple kernel page tables, comprising a processor, characterized in that the processor comprises:

a page table management module, for during initial operation process, dynamically generating at least one kernel page table, so as to operate an untrusted application on a respective page table, and dividing the pre-generated page tables into privileged page tables and non-privileged page tables based on the types of system processes, wherein the privileged page table is mapped with a privileged function, and the non-privileged page table does not contain any of the privileged functions; and a private memory management module, for isolating the memory view between the privileged page table and the non-privileged page table while ensuring the exclusive allocation of private memory in a two-level cache manner, in a stacking management manner, and/or by creating auxiliary page tables, wherein the system is configured for when the system is booted, running all initial processes in a unique initial privileged page table;

when the customizer activates an untrusted application, binding root process of the untrusted application to the page table; and when any process of the untrusted application uses a system call fork to generate a child process, using a non-privileged interface function to force the child process to inherit the page table from its parent process, and mapping and synchronizing the page table of the parent process to the kernel page table of the child process, thereby completing the generation of the child process.

15. The system of claim 14, characterized in that the system is further configured for during the operation of the trusted application, when a kernel execution path triggers a private memory allocator, making the kernel use the non-privileged interface function in the private memory allocator to allocate a private memory for the trusted application.

16. The system of claim 15, characterized in that the system is further configured for when any non-privileged process exits the system, making the process use a page table to exit the interface, so as to reduce the reference count of the page table.

* * * * *